United States Patent [19]

Takaragi

[11] Patent Number: 5,075,767
[45] Date of Patent: Dec. 24, 1991

[54] DIGITAL COLOR IMAGE SIGNAL PROCESSING APPARATUS

[75] Inventor: Yoichi Takaragi, Yokohama, Japan

[73] Assignee: Canon Kabushiki Kaisha, Tokyo, Japan

[21] Appl. No.: 532,360

[22] Filed: Jun. 4, 1990

Related U.S. Application Data

[63] Continuation of Ser. No. 201,871, Jun. 3, 1988, abandoned.

[30] Foreign Application Priority Data

Jun. 5, 1987 [JP] Japan .................. 62-139989

[51] Int. Cl.⁵ .............................. H04N 1/46
[52] U.S. Cl. ........................ 358/75; 358/80
[58] Field of Search ............... 358/75, 78, 79, 80

[56] References Cited

U.S. PATENT DOCUMENTS

| | | | |
|---|---|---|---|
| 4,511,989 | 4/1985 | Sakamoto | 358/75 |
| 4,614,967 | 9/1986 | Sayanagi | 358/75 |
| 4,631,578 | 12/1986 | Sasaki et al. | 358/80 |
| 4,636,844 | 1/1987 | Sasaki | 358/75 |
| 4,642,681 | 2/1987 | Ikeda | 358/79 |
| 4,643,563 | 2/1987 | Sayanagi | 355/77 |
| 4,661,843 | 4/1987 | Sekizawa et al. | 358/80 |
| 4,677,421 | 6/1987 | Taniyama | 358/261.1 |
| 4,682,186 | 7/1987 | Sasaki et al. | 358/75 |
| 4,682,216 | 7/1987 | Sasaki | 358/75 |
| 4,683,492 | 7/1987 | Sugiura et al. | 358/75 |
| 4,700,399 | 10/1987 | Yoshida | 358/79 |
| 4,727,434 | 2/1988 | Kawamura | 358/75 |
| 4,742,399 | 5/1988 | Kitamura | 358/282 |
| 4,800,442 | 1/1989 | Riseman et al. | 358/298 |
| 4,819,193 | 4/1989 | Imao | 358/80 |

FOREIGN PATENT DOCUMENTS

0304773 12/1988 Japan .

Primary Examiner—Jin F. Ng
Assistant Examiner—Jerome Grant II
Attorney, Agent, or Firm—Fitzpatrick, Cella, Harper & Scinto

[57] ABSTRACT

A digital color image signal processing apparatus includes a signal generator that generates a plurality of color component signals and converting circuitry that converts each of the color component signals into a plurality of output signals. A discriminator circuit determines which of the color component signals has minimum value. The minimum value color component signal is used as a basis for selecting at least one of the plurality of output signals which is utilized to obtain each final color signal used for image formation. This apparatus may include a density converter for converting color component signals to density signals, wherein at least one of the density signals is selected for use in image formation in response to the determination by the discriminator circuit of which of the color component signals has a minimum value. Accordingly, this apparatus improves image gradation in low density level areas without requiring large scale processing circuits.

33 Claims, 13 Drawing Sheets

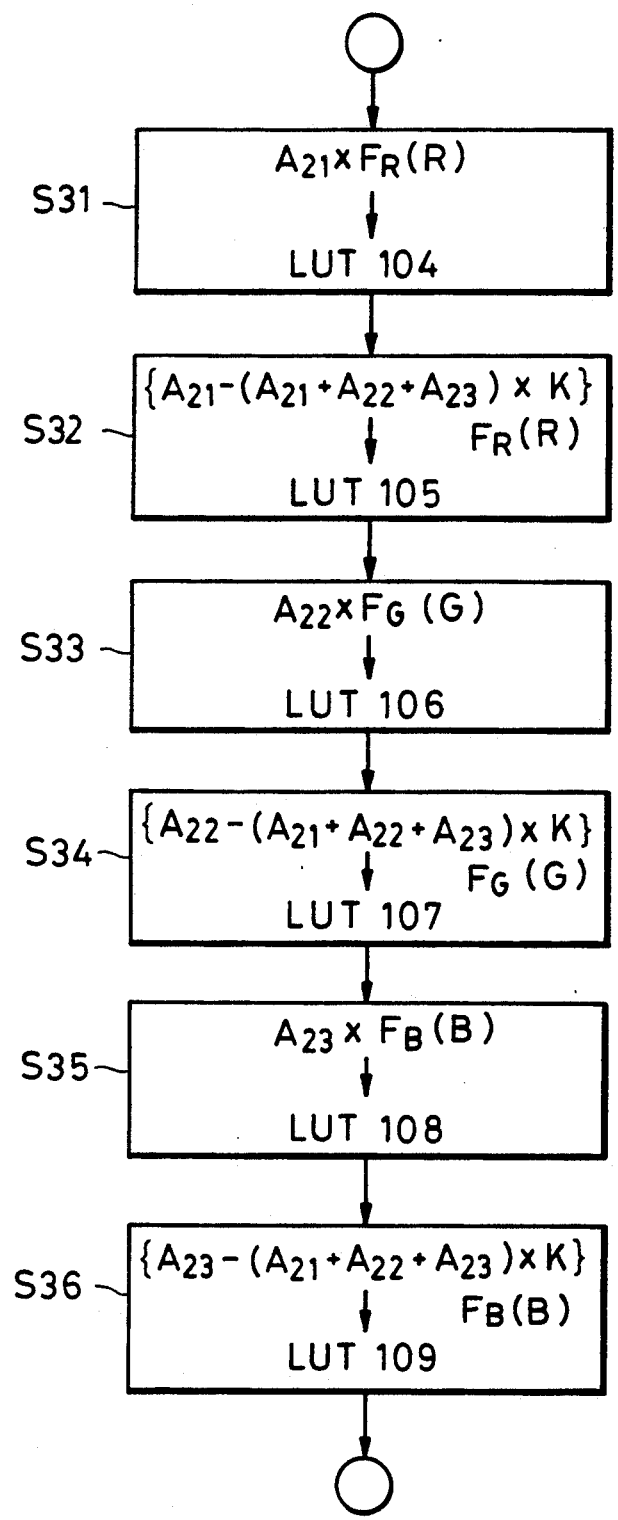
FIG. 3A (S901)

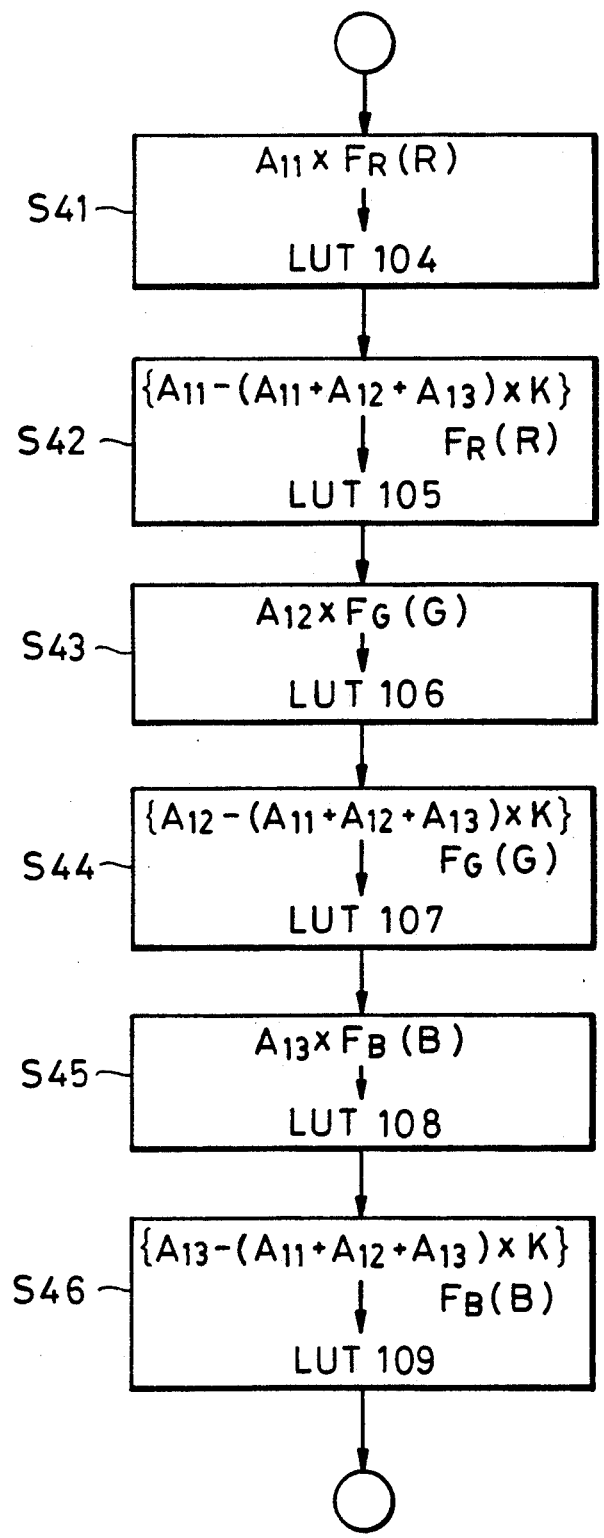

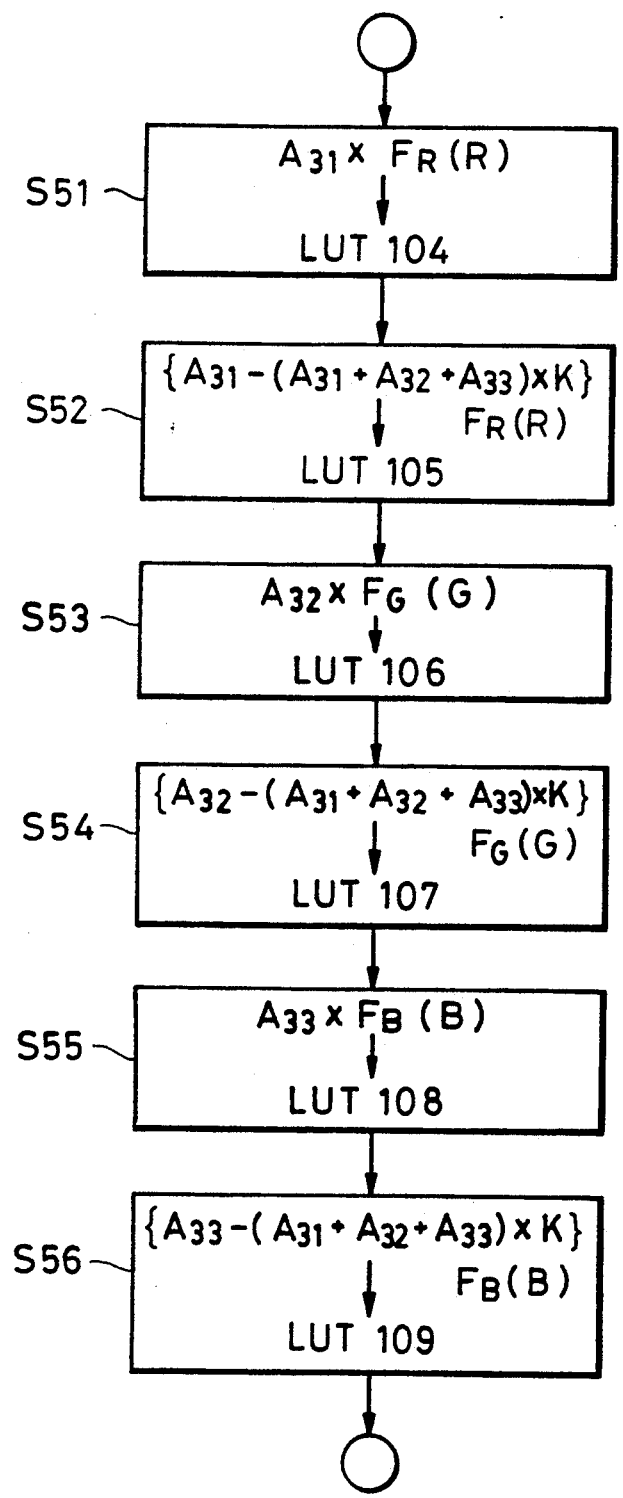
FIG. 5 (S905)

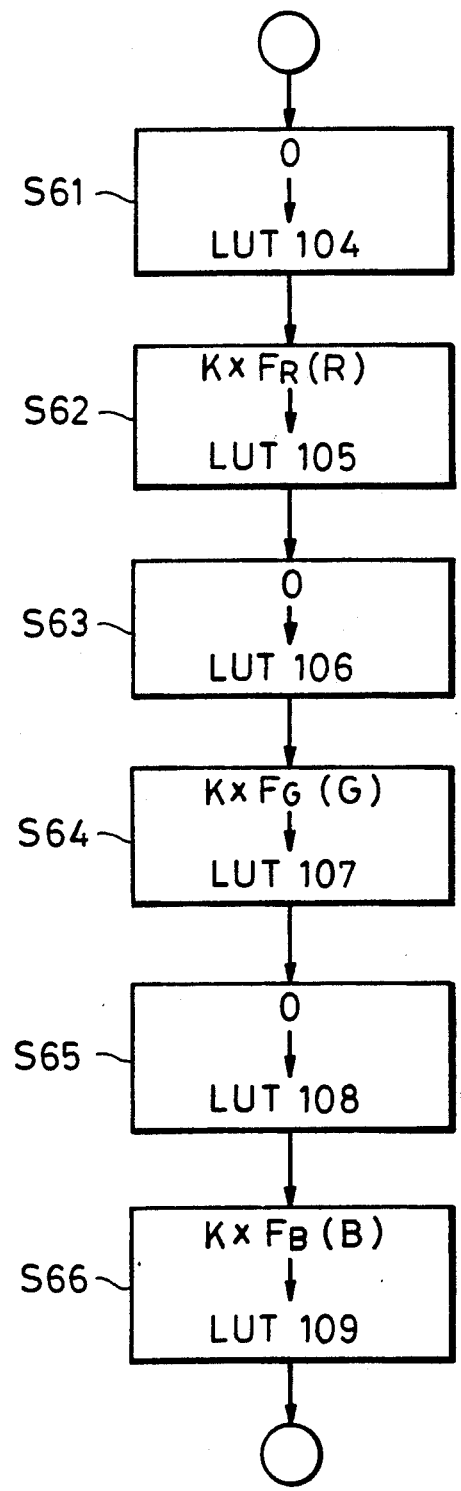
FIG. 6 (S907)

DIGITAL COLOR IMAGE SIGNAL PROCESSING APPARATUS

This application is a continuation of application Ser. No. 201,871 filed June 3, 1988, now abandoned.

BACKGROUND OF THE INVENTION

1. Field of the Invention

The present invention relates to a digital color image signal processing apparatus.

2. Brief Description of the Related Art

One exmaple of conventional color image signal processing circuts for a digital color copier is shown in FIG. 8. As shown there, three digital color luminance signals R (red), G (Green), B (Blue) produced by a CCD (charge coupled device) 301 are converted into three digital color density signals $D_R$, $D_G$, $D_B$ by a density conversion circuit 302. Then the three digital color density signals $D_R$, $D_G$, $D_B$ are input to a black processing circuit 303 which comprises a black component generation circuit for generating a black component BK, and an UCR (Under Color Removal) for respectively removing the black component from the three digital color density signals $D_R$, $D_G$, $D_B$ to obtain digital signals $D_R$, $D_G$, $D_B$ exlcuding the black component. A masking circuit 304 is provided for correcting color signals or removing asymmetrical components, and outputs C (cyan), M (magenta), Y (yellow) signals of the masking circuit 304 and the black component BK from the black processing circuit 303 are supplied to a color printer 305. The color printer 305 reproduces a color image in accordance with supplied signals C, M, Y, BK.

FIG. 9 shows a conventional block diagram in greater detail of the a main part of color image signal processing circuits shown in FIG. 8. As can be seen there, the three digital color luminance signals R, G, B from the CCD 301 (FIG. 8) are respectively input to three look-up tables (LUT) 204, 205, 206 which comprise random access memories (RAM). The LUTs 204, 205, 206 convert the input color luminance signals R, G, B into the three digital color density signals $D_R$, $D_G$, $D_B$. FIG. 10 shows a characteristic for conversion of the luminance signals R, G, B into the density signals $D_R$, $D_G$, $D_B$. In this case, each of the luminance signals R, G, B is an 8-bit signal, namely each luminance signal has 256 steps of halftone gradation. Each characteristic of the LUTs 204, 205, 206 is able to be expressed by the following relations:

$$D_R = F_R(R) \\ D_G = F_G(G) \\ D_B = F_B(B) \quad (1)$$

where $F_R$, $R_G$, $F_B$ respectively are functions of three characteristics of the LUTs 204, 205, 206.

A minimum value determining circuit 207 detects and outputs a minimum value from among the density signals $D_R$, $D_G$, $D_B$ and a multiplier 208 multiplies the minimum of the density signals, MIN ($D_R$, $D_G$, $D_B$), by a constant K ($0<K\leq1$) in order to obtain the black component signal BK. That is:

$$BK = K \times MIN(D_R, D_G, D_b) \quad (2)$$

Three subtractors 209, 210, 211 are also provided for respectively subtracting the black component signal BK frome ach of the three density signals $D_R$, $D_G$, $D_B$ in accordance with he following relation:

$$D_R' = D_R - BK \\ D_G' = D_G - BK \\ D_B' = D_B - BK \quad (3)$$

A masking processing circuit 212 comprises multipliers and adders, and performs the operation of the following relation.

$$\begin{pmatrix} C \\ M \\ Y \end{pmatrix} = \{A_{IJ}\} \begin{pmatrix} D_R' \\ D_G' \\ D_B' \end{pmatrix} \quad (4)$$

where $\{A_{IJ}\}$ is a linear 3×3 matrix, and C, M and Y respectively represent the resulting cyan signal, magenta signal and yellow signal.

Then signals C, M, Y and BK are supplied to the digital color ptiner 213 which i capable of reproducing color gradation.

In the above mentioned conventional processing circuit, however, output color signals C, M, Y are obtained from input color signals R, G, B, by being processed through a series of adders, subtractors and multipliers. Therefore, the signals C, M, Y may have digital operational errors. In order to reduce the digital operational errors, each processing circuit should increase the number of bits used in the processing. However, this causes the size of the processing circuit nessarily to become large.

As shown in FIG. 10 and FIG. 11, the characteristic of conversion is very similar to a logarithmic function. Thus, if a simple LUT is provided as a convertor for converting from a luminance signal to a density signal, gradation loss occurs especially in the low density level area (highlight area).

In order to prevent the gradation loss in the low density level are, the number of output bits of the LUT is set greater than a number of input bits as shown in FIG. 12 and FIG. 13. FIG. 12 shows a characteristic of a LUT 130 in FIG. 13. However, in FIG. 9, if the number of bits of each density signal $D_R$, $D_G$, $D_B$ is increased, other processing circuits in FIG. 9 must be specified appropriately to properly operate on such additional bits. Therefore, the scale of each processing circuit also becomes very large.

SUMMARY OF THE INVENTION

The present invention overcomes the above described problems by providing a digital color image signal processing circuit that can improve the gradation in the low density level area without using large scale processing circuits.

In one aspect the present invention converts each input signal to a plurality of output signals, selects some of the output signals, and adds together the selected output signals to obtain each final color signal.

In another aspect, the invention comprises a density converter for converting a plurality of digital color signals to a plurality of density signals, a minimum value discriminator for discriminating the digital signal having minimum value from among the plurality of digital color signals, and a selector for selecting density signals from the converter in response to the result of the discrimination by the discriminator.

The foregoing summary of certain more important features of the invention is provided in order that the detailed description of the preferred embodiment thereof that follows may be better understood, and in order that the present contribution to the art may be better appreciated. There are, of course, additional features of the invention that will be described in that detailed description with reference to the accompanying drawings. Those skilled in the art will appreciate that the conception upon which this disclosure is based may readily be utilized as a basis for designing other structures or methods for carrying out the purposes of the invention. It will be understood what the claims are to be regarded as including such other constructions and methods as do not depart from the spirit and scope of the invention.

BRIEF DESCRIPTION OF THE DRAWINGS

FIG. 3A is a flow chart illustrating the setting of LUTs for processing a magenta signal M.

FIGS. 4, 5 and 6 are flow charts respectively illustrating the setting of LUTs for processing a cyan signal C, a yellow signal Y and a black component signal BK respectively.

DETAILED DESCRIPTION OF THE PREFERRED EMBODIMENT

Before explaining the circuit in accordance with a preferred embodiment, the basic principle of the present invention will be described below.

The prescribed equations (1) through (4) can be rewritten as follows.

$$\begin{pmatrix} C \\ M \\ Y \end{pmatrix} = \{A_{IJ}\} \begin{pmatrix} D_R' \\ D_G' \\ D_B' \end{pmatrix} \tag{5}$$

$$= \{A_{IJ}\} \begin{pmatrix} D_R - BK \\ D_G - BK \\ D_B - BK \end{pmatrix}$$

$$= \{A_{IJ}\} \begin{pmatrix} D_R - K \times \mathrm{MIN}(D_R, D_G, D_B) \\ D_G - K \times \mathrm{MIN}(D_R, D_G, D_B) \\ D_B - K \times \mathrm{MIN}(D_R, D_G, D_B) \end{pmatrix}$$

Therefore, the following three cases I, II, III can be considered.

(I) In the case where MIN $(D_R, D_G, D_B) = D_R$.

$$\begin{pmatrix} C \\ M \\ Y \end{pmatrix} = \{A_{IJ}\} \begin{pmatrix} (1 - K) \times D_R \\ D_G' - K \times D_R \\ D_B' - K \times D_R \end{pmatrix} \tag{6}$$

$$= \begin{pmatrix} A_{11}, A_{12}, A_{13} \\ A_{21}, A_{22}, A_{23} \\ A_{31}, A_{32}, A_{33} \end{pmatrix} \begin{pmatrix} (1 - K) \times D_R \\ D_G - K \times D_R \\ D_B - K \times D_R \end{pmatrix}$$

$$= \begin{pmatrix} A_{11} - (A_{11} + A_{12} + A_{13}) \times K, A_{12}, A_{13} \\ A_{21} - (A_{21} + A_{22} + A_{23}) \times K, A_{22}, A_{23} \\ A_{31} - (A_{31} + A_{32} + A_{33}) \times K, A_{32}, A_{33} \end{pmatrix} \begin{pmatrix} F_R(R) \\ F_G(G) \\ F_B(B) \end{pmatrix}$$

(II) In the case where MIN $(D_R, D_G, D_B) = D_G$ $$\begin{pmatrix} C \\ M \\ Y \end{pmatrix} = \begin{pmatrix} A_{11}, A_{12} - (A_{11} + A_{12} + A_{13}) \times K, A_{13} \\ A_{21}, A_{22} - (A_{21} + A_{22} + A_{23}) \times K, A_{23} \\ A_{31}, A_{32} - (A_{31} + A_{32} + A_{33}) \times K, A_{33} \end{pmatrix} \begin{pmatrix} F_R(R) \\ F_G(G) \\ F_B(B) \end{pmatrix} \tag{7}$$

(III) In the case where MIN $(D_R, D_G, D_B) = D_B$ $$\begin{pmatrix} C \\ M \\ Y \end{pmatrix} = \begin{pmatrix} A_{11}, A_{12}, A_{13} - (A_{11} + A_{12} + A_{13}) \times K \\ A_{21}, A_{22}, A_{23} - (A_{21} + A_{22} + A_{23}) \times K \\ A_{31}, A_{32}, A_{32} - (A_{31} + A_{32} + A_{33}) \times K \end{pmatrix} \begin{pmatrix} F_R(R) \\ F_G(G) \\ F_B(B) \end{pmatrix} \tag{8}$$

Now, the cyan signal C can be expressed as follows:

$$\begin{pmatrix} C_R \\ C_G \\ C_B \end{pmatrix} = \begin{pmatrix} A_{11} - (A_{11} + A_{12} + A_{13}) \times K, A_{12}, A_{13} \\ A_{11}, A_{12} - (A_{11} + A_{12} + A_{13}) \times K, A_{13} \\ A_{11}, A_{12}, A_{13}, -(A_{11} + A_{12} + A_{13}) \times K \end{pmatrix} \begin{pmatrix} F_R(R) \\ F_G(G) \\ F_B(B) \end{pmatrix} \tag{9}$$

where $C_R$ is the cyan signal C in the case (I), i.e., MIN $(D_R, D_G, D_B) = D_R$.

$C_G$ is the cyan signal in the case (II), i.e., MIN $(D_R, D_G, D_B) = D_G$.

$C_B$ is the cyan signal C in the case (III), i.e., MIN $(D_R, D_G, D_B) = D_B$.

As shown in the equation (9), in order to obtain the cyan signal C, operation of the processing circuits for each input color signal is necessary.

Figure 14:
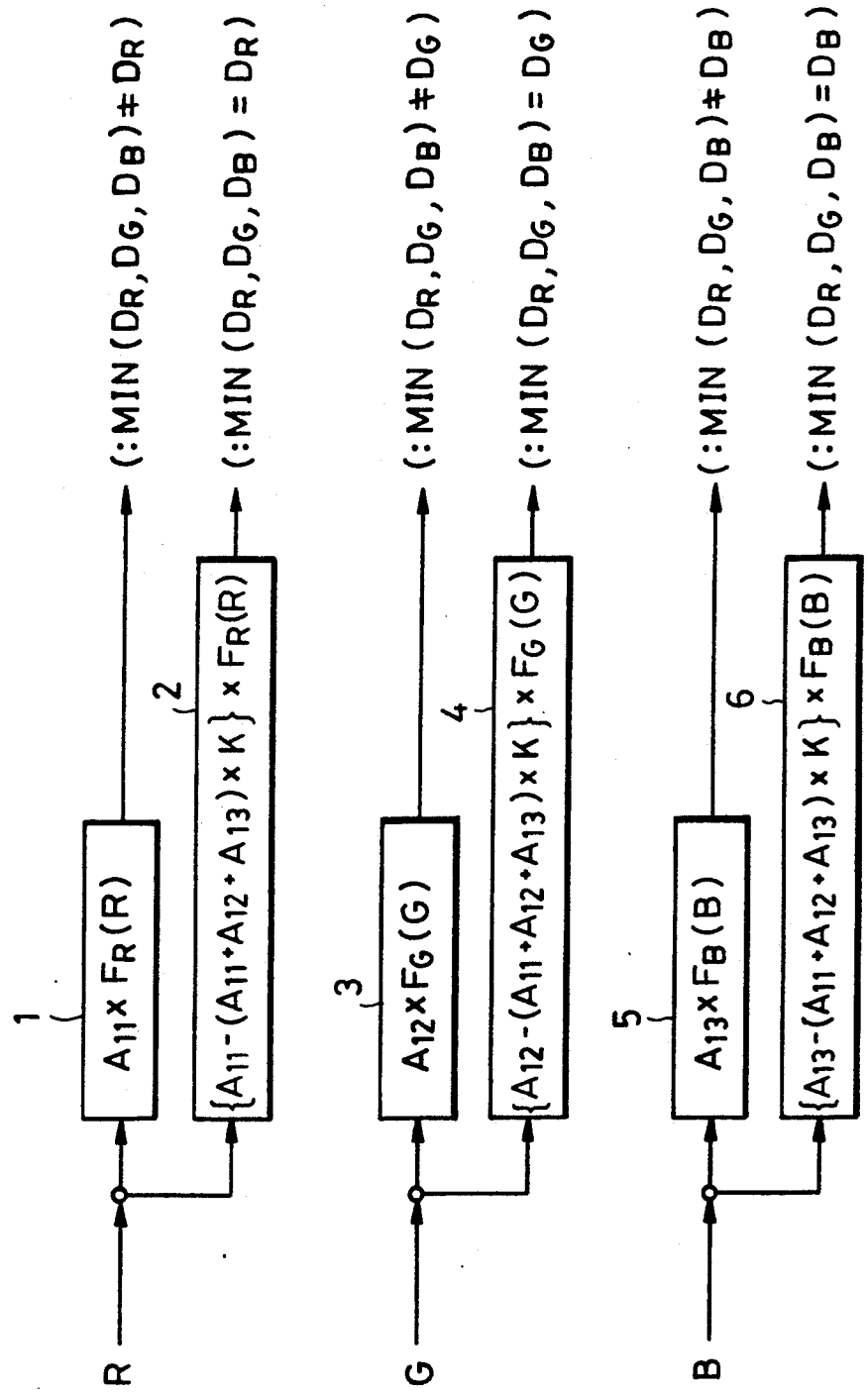
FIG. 14 is a block diagram of circuitry for determining the minimum value from among the R, G and B signals.

FIG. 14 shows two circuits 1 and 2 for the input color signal R, two circuits 3 and 4 for the input color signal G, and two circuits 5 and 6 for the input color signal B.

In the equation (9), all elements or coefficients of the 3×3 matrix are constants, so that the operation circuits 1 through 6 in FIG. 14 can be structured merely by conventional look-up tables.

Further, the coefficients of the matrix are limited as follows:

$$0 < A_{11} < 4 \tag{10}$$

$$-1 < A_{12} < 1$$

$$-1 < A_{13} < 1$$

And the constant K is limited as follows;

$$0 < K \leq 1 \tag{11}$$

Therefore, the following equations are derived from the equations (10) and (11).

$$-2 < A_{11} - (A_{11} + A_{12} + A_{13}) \times K < 4 \tag{12}$$

$$-2 < A_{12} - (A_{11} + A_{12} + A_{13}) \times K < 4$$

$$-2 < A_{13} - (A_{11} + A_{12} + A_{13}) \times K < 4$$

Based on the equation (12), an increase of three bits in each of the operation circuits 126 is sufficient, with these three bits including a polarity bit, to remove the operational error in the circuits 126.

The above discussion is only of processing the cyan signal.

The same explanation applies to the magenta signal M and the yellow signal Y. For example, referring to the magenta signal M:

$$\begin{pmatrix} M_R \\ M_G \\ M_B \end{pmatrix} = \begin{pmatrix} A_{21} - (A_{21} + A_{22} + A_{23}) \times K, A_{22}, A_{23} \\ A_{21}, A_{22} - (A_{21} + A_{22} + A_{23}) \times K, A_{23} \\ A_{21}, A_{22}, A_{23} - (A_{21} + A_{22} + A_{23}) \times K \end{pmatrix} \begin{pmatrix} F_R(R) \\ F_G(G) \\ F_B(B) \end{pmatrix} \tag{13}$$

where $M_R$ is the magenta signal M in the case (I), i.e., MIN $(D_R, D_G, D_B) = D_R$.

$M_G$ is the magenta signal M in the case (II), i.e., MIN $(D_R, D_G, D_B) = D_G$.

$M_B$ is the magenta signal M in the case (III), i.e., MIN $(D_R, D_G, D_B) = D_B$.

Referring to the yellow signal Y:

$$\begin{pmatrix} Y_R \\ Y_G \\ Y_B \end{pmatrix} = \begin{pmatrix} A_{31} - (A_{31} + A_{32} + A_{33}) \times K, A_{32}, A_{33} \\ A_{31}, A_{32} - (A_{31} + A_{32} + A_{33}) \times K, A_{33} \\ A_{31}, A_{32}, A_{33} - (A_{31} + A_{32} + A_{33}) \times K \end{pmatrix} \begin{pmatrix} F_R(R) \\ F_G(G) \\ F_B(B) \end{pmatrix} \tag{14}$$

where $Y_R$ is the yellow signal Y in the case (I), i.e., MIN $(D_R, D_G, D_B) = D_R$.

$Y_G$ is the yellow signal Y in the case (II), i.e., MIN $(D_R, D_G, D_B) = D_G$.

$Y_B$ is the yellow signal Y in the case (III), i.e., MIN $(D_R, D_G, D_B) = D_B$.

The black signal component signal BK can also be described as below.

$$\begin{pmatrix} BK_R \\ BK_G \\ BK_B \end{pmatrix} = K \times \begin{pmatrix} F_r(R) \\ F_r(G) \\ F_r(B) \end{pmatrix} \tag{15}$$

where $BK_R$ is the black signal BK in the case (I), i.e., MIN $(D_R, D_G, D_B) = D_R$.

$BK_G$ is the black signal BK in the case (II), i.e., MIN $(D_R, D_G, D_B) = D_G$.

$BK_B$ is the black signal BK in the case (III), i.e., MIN $(D_R, D_G, D_B) = D_B$.

$$\tag{16}$$

The black component signal BK also can be obtained by using a conventional look-up table for the input color signals R, G, B.

As described above, it will be understood that the final output signals C, M, Y can be obtained by using a pair of operational circuits for each input color signal, a selecting circuit for selecting one of the outputs of the pair of operational circuits in response to the input signal that has minimum value, and an adder circuit for adding the selected signals.

Figure 9:
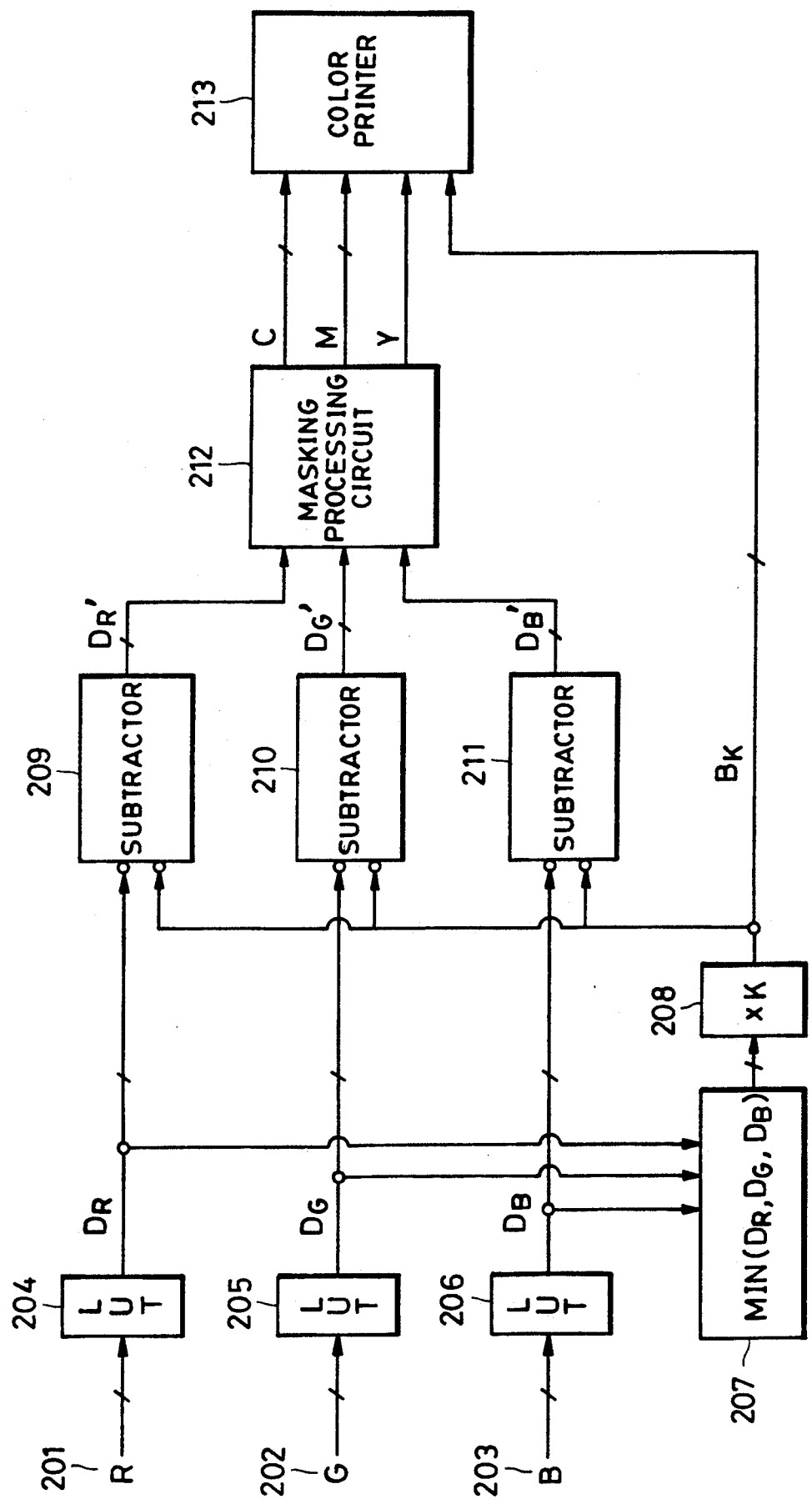
FIG. 9 is a detailed block diagram of a part of the circuit shown in FIG. 8.
Figure 10:
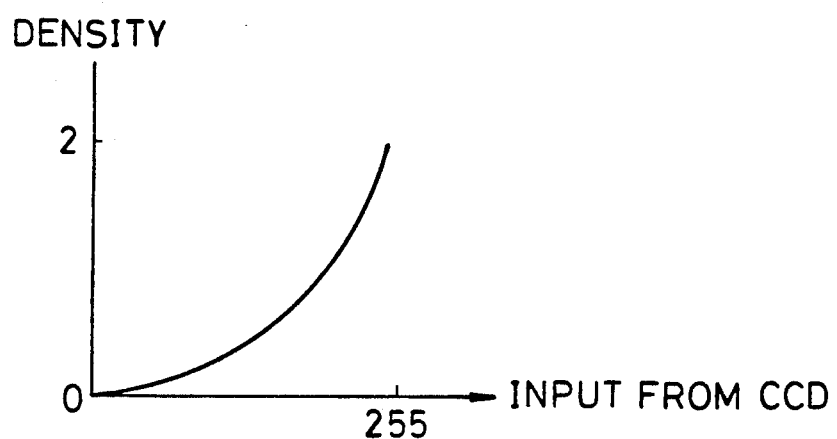
FIG. 10 and FIG. 11 are graphs showing characteristics of density conversion.
Figure 11:
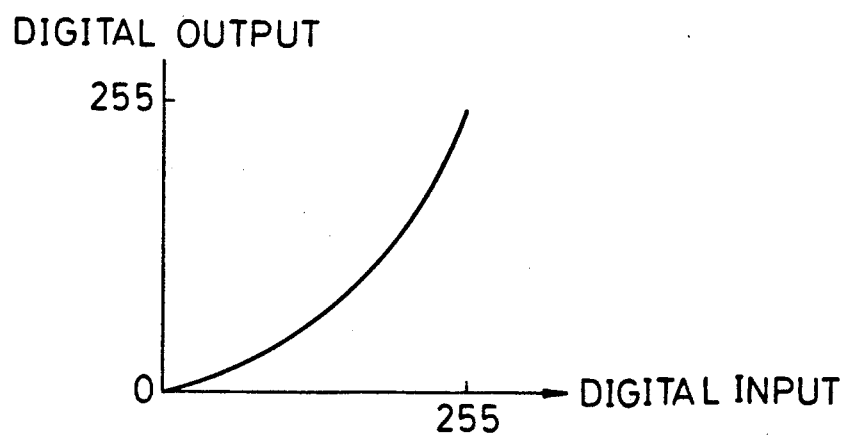

These structures provide the same result provided by the conventional color processing circuit shown in FIG. 9, but the increase in the number of bits, which must be processed by the look-up table in order to operate, is only three bits.

The detailed description of the preferred embodiment of the present invention will now be provided with reference to the Figures.

Figure 1:
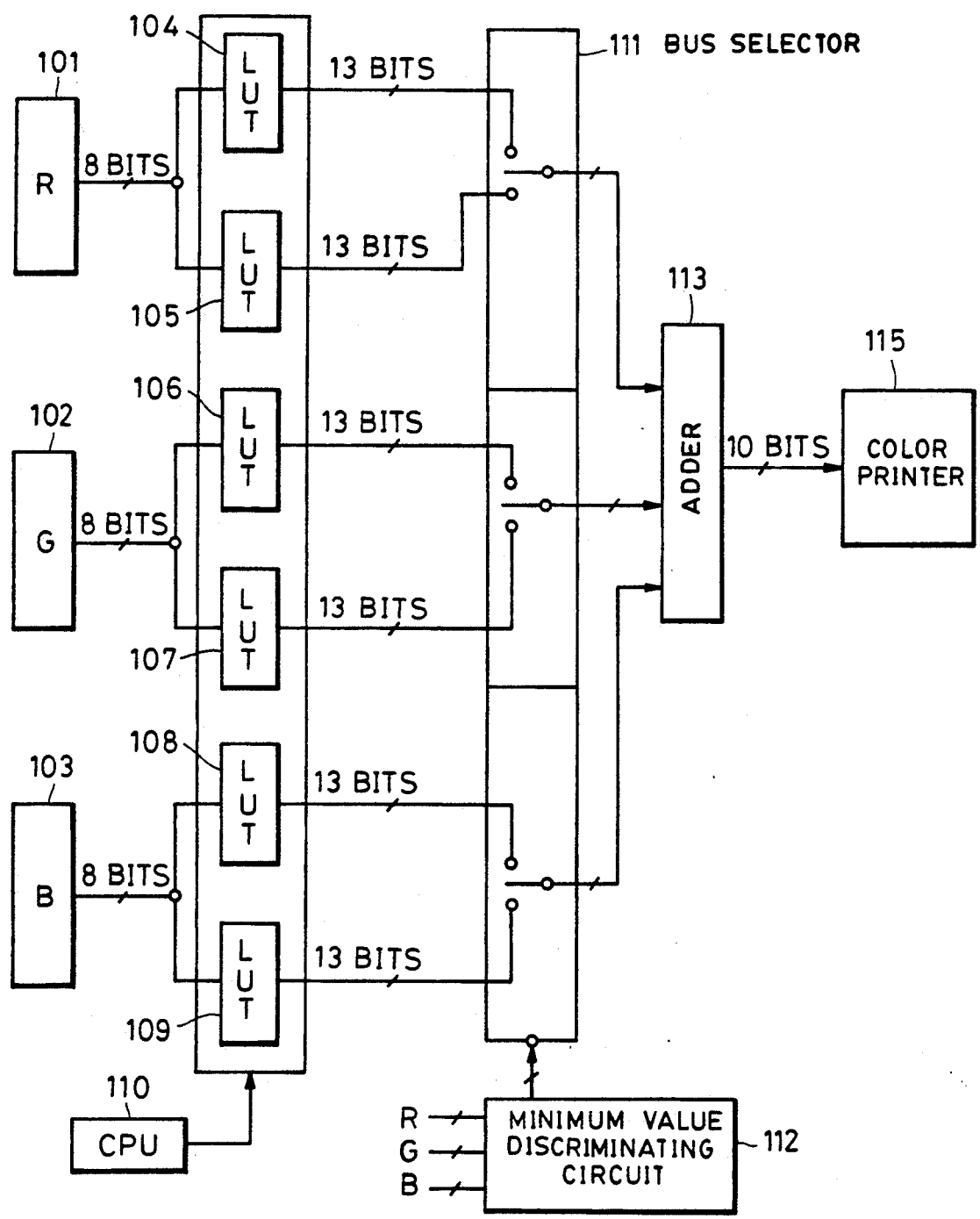
FIG. 1 is a block diagram illustrating one embodiment of the present invention.

Referring first to FIG. 1, a red signal input part 101 is provided for inputting a digital red luminance signal R which has 8 bits. Similarly, a green signal input part 102 and a blue signal input part 103 are provided for respectively inputting a digital green luminance signal and a digital blue luminance signal each having 8 bits.

Look-up tables (LUT) 104 to 109 are provided for converting the density level of the input luminance signals and comprise random access memories (RAM). The LUTs 104 to 109 each have 8 bit inputs and 13 bit outputs in this embodiment. A central processing unit (CPU) 110 is provided for calculating the coefficients set in the LUTs 104 to 109 and for writing the coefficients set in the LUTs 104 to 109. A bus selector 111 is provided for selecting a bus line for the color digital signals in response to a signal from a minimum value discriminating circuit 112. The minimum value discriminating circuit 112 discriminates the signal which has the minimum density value from among the color luminance signals R, G, B, and controls the bus selector 111.

An adder 113 is provided for adding the outputs from the bus selector 111, and the adder 113 outputs 10 bits to a color printer 115. The color printer 115 prints a color image in response to outputs of the adder 113.

Figure 2:
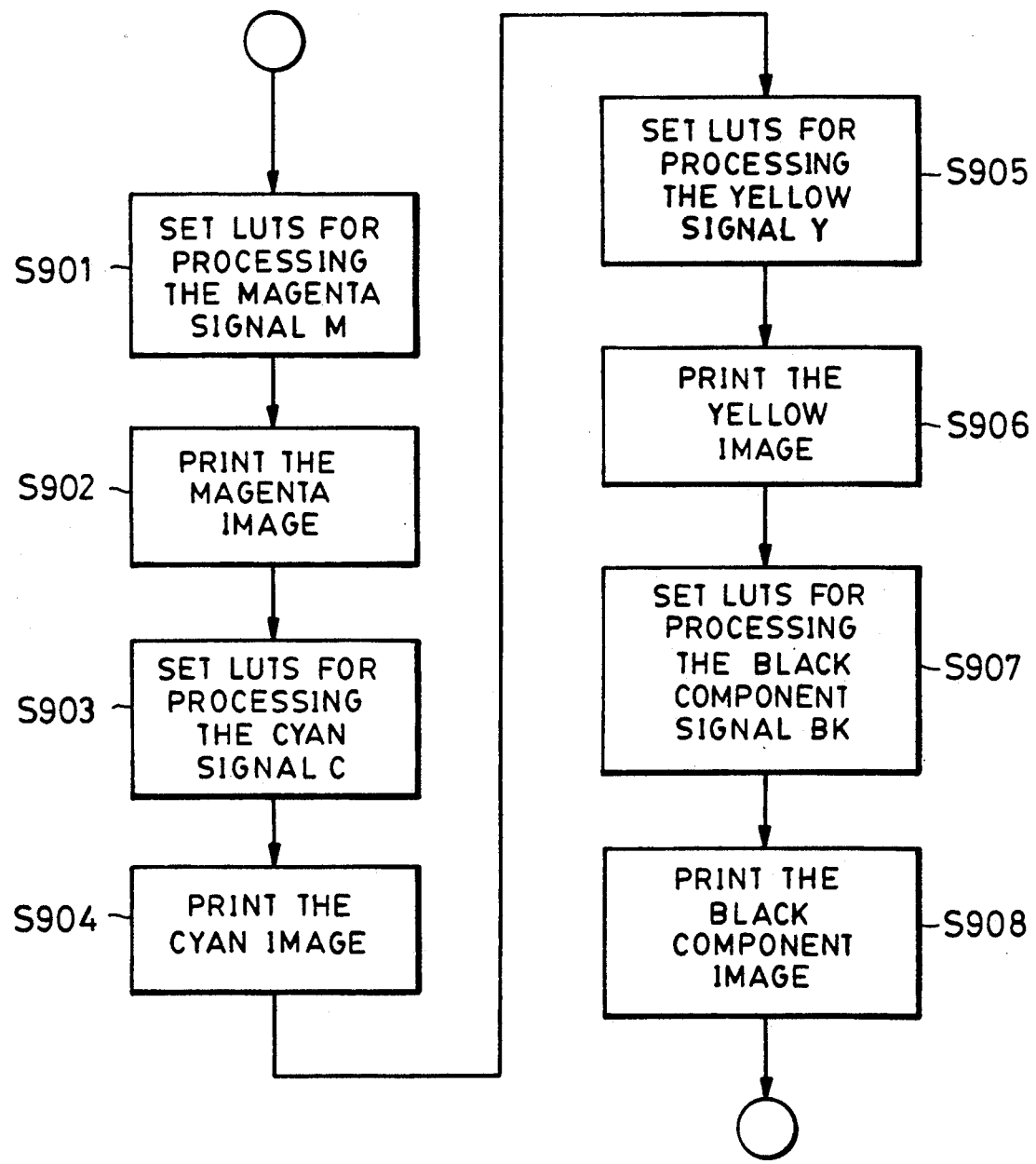
FIG. 2 is a flow chart illustrating a color printing process.

FIG. 2 is a flow chart illustrating a color print process. In this embodiment, the color printer 115 prints a magenta image first, then prints a cyan image, then prints a yellow image, and finally prints a black image. The color printer 115 doesn't start printing a succeeding color before it finishes printing the preceding color.

In a step S901, the CPU 110 performs multiplications on each of the coefficients of the matrix in the equation (13) and each of $F_R(R)$, $F_G(G)$, $F_B(B)$ in the CPU 110, and sets and stores the resulting values of the multiplications in he LUTs 104 to 109.

FIG. 3A is a concise flow chart illustrating setting the magenta signal into the LUTs.

In a step S31, the CPU 110 performs $A21 \times F_R(R)$, and stores the value of the operation in the LUT 104 for every value of the input color signal (R). Similarly, in the step S32, the CPU 110 calculates $\{A_{31} - (A_{21} + A_{22} + A_{23}) \times K\} \times F_R(R)$, and stores the value of the operation in the LUT 105 for every value of (R).

Further, in a step S33, the CPU 110 performs $A_{22} \times F_G(G)$, and stores the results in the LUT 106 for every value of the input color signal (G). In a step S34, the CPU 110 performs $\{A_{22} - (A_{21} + A_{22} + A_{23}) \times K\} \times F_G(G)$ for every value of the input color signal (G) and stores the results in the LUT 107.

In a step S35, the CPU 110 performs $A_{23} \times F_B(B)$ for every value of the input color signal (B), and stores the results in the LUT 108.

In a Step S36, the CPU 110 performs $\{A_{23} - (A_{21} + A_{22} + A_{23}) \times K\} \times F_B(B)$ for every value of the input color signal (B), and stores the results in the LUT 109. Namely the odd numbered LUTs 105, 107, 109 respectively store the results when the corresponding color signal is the minimum value, and the even numbered LUTs 104, 106, 108 respectively store the results when the corresponding color signal is not the minimum value.

The bus selector 111, which comprises conventional multiplexers, selects the lower signal when the corresponding color signal has the minimum value, and selects the upper signal when the corresponding color signal does not have the minimum value.

Figure 3B:
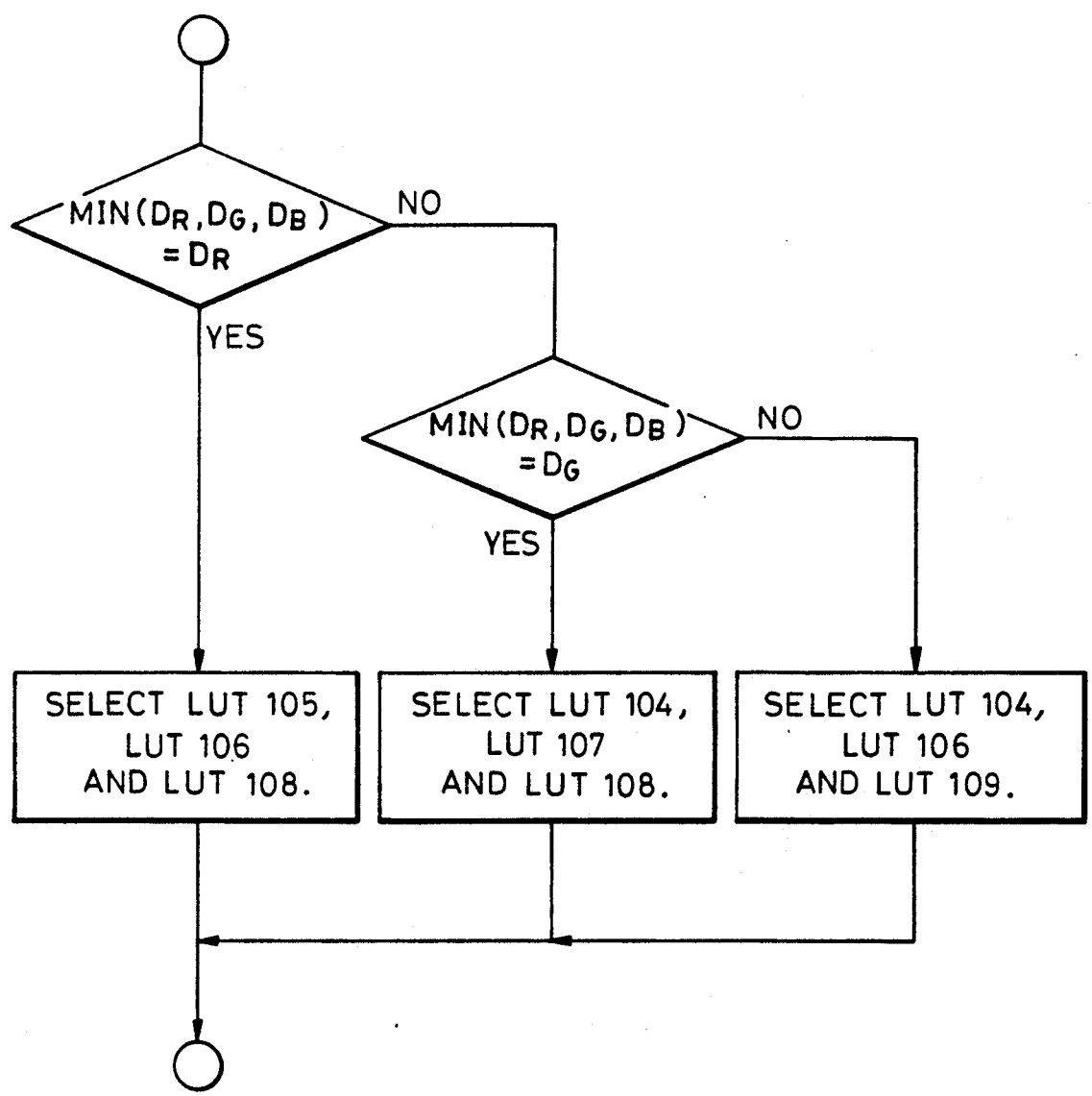
FIG. 3B is a flow chart illustrating control of a lens selector.

The bus selector 111 can be controlled by a microcomputer using a program shown in FIG. 3B.

In a step S902 (FIG. 2), the color printer 115 prints the magenta image in response to the magenta signal M. Similarly, in a step S903, the CPU 110 multiplies each of the coefficients of the matrix in equation (14) and each of $F_R(R)$, $F_G(G)$, $F_B(B)$ stored in the CPU 110, and sets and stores the resulting values of the multiplications in the LUTs 104 to 109 for the cyan signal. These operations are shown steps S41 through S46 in FIG. 4.

Then, in a step S904, the bus selector 111 operates as described above and the color printer 115 prints the cyan image in response to the cyan signal C.

Similar to the processing for the magenta and cyan images, in a step S905, the CPU 110 multiplies each of the coefficients of the matrix in the equation (14) and each of $F_R(R)$, $F_G(G)$, $F_B(B)$ stored in the CPU 110, and sets or stores the resulting values of the multiplications in the LUTs 104 to 109 for the yellow signal. These operations are shown as steps S51 in S56 in FIG. 5.

In a step S906, the bus selector 111 operates as described above, and the color printer 115 prints the yellow image in response to the yellow signal Y obtained from the adder 113.

Then, in a step S907, the CPU 110 multiplies the constant K and each of $F_R(R)$, $F_G(G)$, $F_B(B)$ stored in the CPU 110, and sets or stores the resulting values of the mulitplications in the LUTs 105, 107, 109 for the black component signal. On the other hand, the CPU 110 sets "0" in the LUTs 104, 106, 108. These operations are shown in steps S61 to S66 in FIG. 6.

Then in a step S908, the bus selector 111 operates the same as described above, and the color printer 115 prints the black image in response to the black componetn signal BK obtained from the adder 113.

Figure 12:
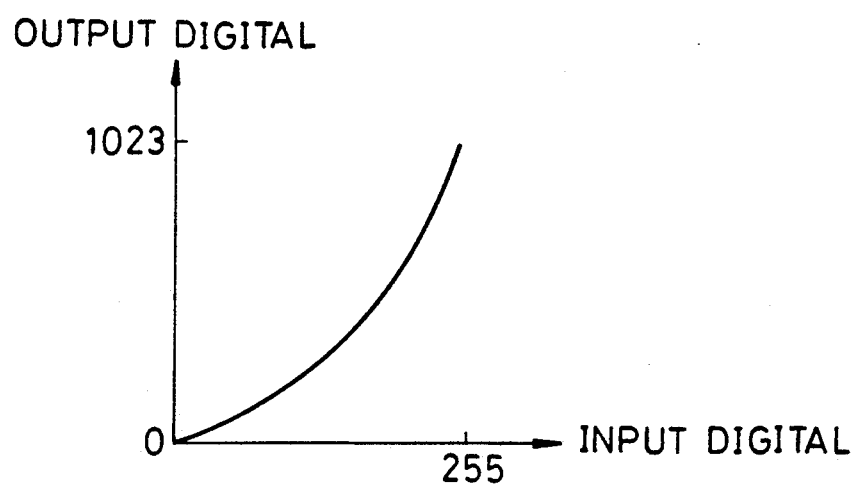
FIG. 12 is a graph showing a characteristic of LUT 130.
Figure 13:
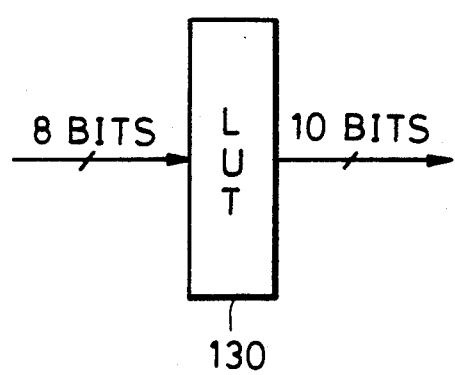
FIG. 13 is a block diagram illustrating a density conversion.

The values of $F_R(R)$, $F_G(G)$, $F_B(B)$ stored in the CPU have 10 bits output versus 8 bits input, as shown in FIG. 12 which shows a characteristic of the LUT in FIG. 13.

A characteristic of the LUT in FIG. 13 is that it has a number of output bits greater than the number of input bits.

Therefore the gradation loss in the low density level should be reduced.

By the way, the adder 113 shown in FIG. 1 has thirteen input bits and ten output bits in this embodiment.

Figure 7:
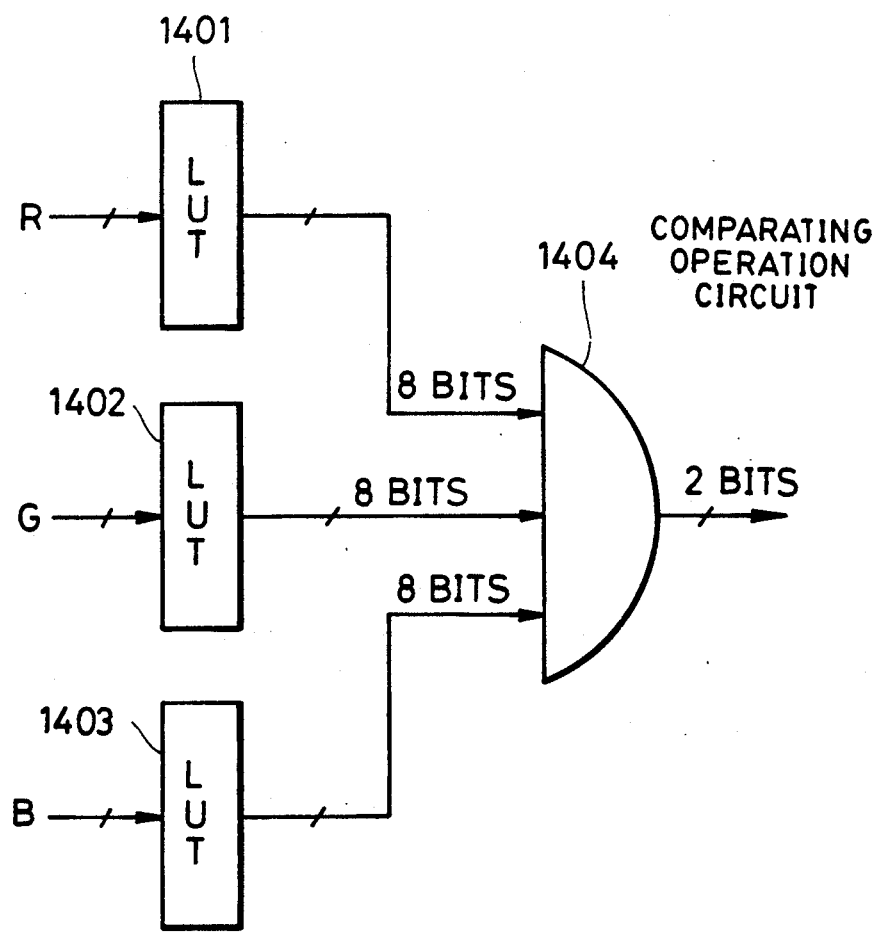
FIG. 7 is a block diagram illustrating a minimum value discriminating circuit.
Figure 8:
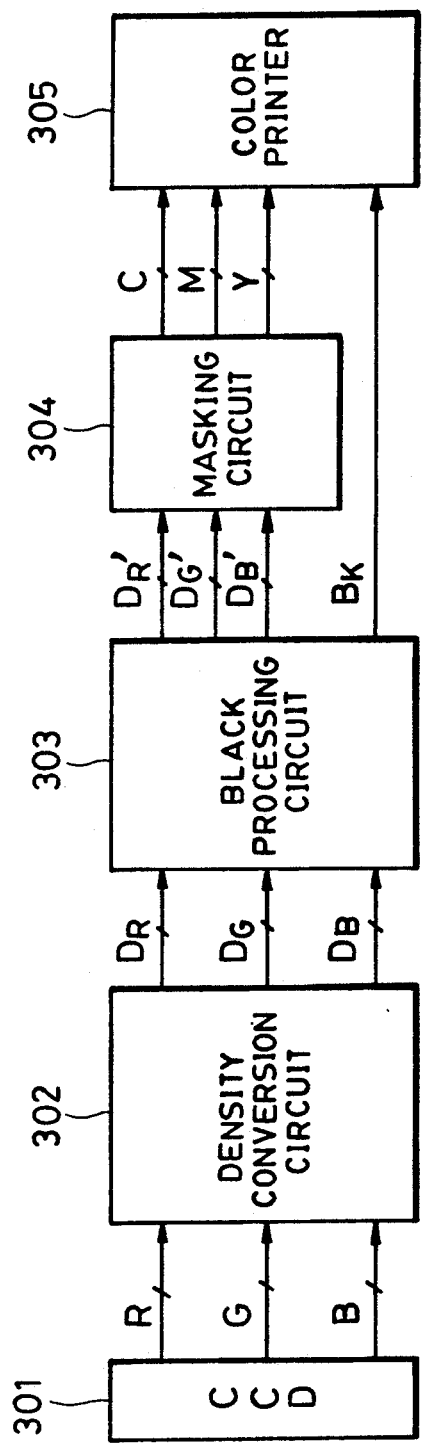
FIG. 8 is a block diagram illustrating a conventional color image processing circuit.

FIG. 7 is a block diagram illustrating an example of the minimum value discriminating circuit 112. As shown there, LUTs 1401, 1402, 1403, which comprie read only memories (ROMs), are provided for storing converted density values corresponding to the input luminance signals R, G, B obtained from the CCDs. The conversion characteristics of these LUTs are shown by the equation (1).

A comparative operation circuit 1404, which has 3 input terminals and one 2-bit output terminal, discriminates which signal has the minimum value, and outputs the result of the discriminating to the bus selector 111.

In this above-mentioned embodiment, the number of bits of the output color signal is set to be greater than that of the input color signa lin order to improve the gradation characteristic in the low density level area. However, if the number of bits of the output color signal is set to be smaller than that of the input color signals, a structure of a processing circuit is simplified.

In the above-described embodiment, the color printer prints each color M, C, Y, BK individually and sequentially.

However, if the circuit of FIG. 1 is provided for each color, specifically if the LUTs 104 to 109, the bus selector 111, and the adder 113 are provided in parallel for all colors Y, M, C, Bk, then the color image processing for all colors proceeds simultaneously and the color image of all colors can be printed simultaneously.

As mentioned above, the present invention, which includes the selector for selecting the calculated or converted signal values and the adder for adding the selected values, enables the color image processing circuit to be simplified. Further if the number of bits of the output color signal is set greater than that of the input color signals, the gradation characteristic, especially that of the low density level area can be improved.

Although particular embodiments of the present invention are herein described in detial for purposes of explanation, various modifications thereof, after study of this specification, will be apparent to those skilled in the art to which the invention pertains.

What is claimed is:

1. A digital color image signal processing apparatus comprising:
   a generator for generating a plurality of color component signals;
   a converter for converting each color component signal to a plurality of predetermined signals; and
   a selector for selecting one signal from among the predetermined signals of each color component signal in which selecting conditions of said selector vary depending on whether or not a signal corresponds to a minimum value among said plurality of color component signals, the selected signals being used for image formation.

2. A digital color image signal processing apparatus according ot claim 1, said selector also including a discriminator for discriminating which color component signal has a minimum density value.

3. A digital color image signal processing apparatus according to claim 1, further comprising a color printer which prints each color individually and sequentially, utilizing the selected signals.

4. A digital color image signal processing apparatus according to claim 1, said converter comprising a digital processing circuit, wherein he number of input bits to said digital processing circuit is smaller than the number of output bits therefrom.

5. A digital color image signal processing apparatus according to claim 4, wherein said digital processing circuit comprises a memory which has a look-up table.

6. A digital color image signal processing apparatus, comprising:
a generator for generating a plurality of color component signals;
a converter capable of converting each color component signal to a plurality of predetermined signals each having a different value;
control means for providing one signal from among the plurality of different signals for each color component signal in which generating conditions of said control means vary depending on whether or not a signal corresponds to a particular signal among said plurality of color component signals; and
processing means for processing the signals generated by said control means to provide color image formation signals.

7. Apparatus according to claim 6, wherein said processing means sums the signals generated from said converter to provide said color image formation signals.

8. A digital color image signal processing apparatus according ot claim 6, wherein said particular signal characteristic is a minimum density value among values corresponding to said color component signals.

9. A digital color image signal processing apparatus according to claim 8, said control means also including a discriminator for discriminating which color component signal has a minimum density value.

10. Apparatus according to claim 6, wherein said converter comprises first and second look up tables for each of the color component signals.

11. Apparatus according to claim 10, whreins aid control means selects one output signal from among said first and second look up tables in response to which color component signal has the particular signal characteristic.

12. A digital color image signal processing apparatus, comprising:
a generator for generating a plurality of color component signals, each said signal being represented by n-bits;
converting means for converting each of said plurality of color component signals into a corresponding plurality of converted signals, each said converted signal being represented by m-bits where (m>n); and
processing means for color-processing said plurality of converted signals and outputting color image formation signals.

13. Apparatus according to claim 12 further including a central processing unit for calculating coefficients and transferring said coefficients to said converting means, said converting means utilizing said coefficients to convert the color component signals into the converted signals.

14. A digital color image signal processing apparatus according to claim 12, wherien each of said color image formation signals is represented by n-bits.

15. A digital color image signal processing apparatus according to claim 12, wherien said plurality of color component signals include an R signal, a B signal and a G signal.

16. Apparatus according to claim 15 wherein said converting means comprises first and second look up tables for each of said R, G, and B signals.

17. A digital color image signal processing apparatus, comprising:
a generator for generating a plurality of color component signals;
a converter capable of converting each color component signal into a plurality of predetermined signals each having a different value; and,
control means for providing one signal from among the plurality of different signals for each color component signal in which generating conditions of said control means vary depending on whether or not a signal corresponds to a minimum value among said plurality of color component signals; and
processing means for processing the signals generated by said control means to provide color image formation signals.

18. Apparatus according to claim 17, wherein said processing means sums the signals generated from said control means to provide said color image formation signals.

19. Apparatus according to claim 17, wherein said converter comprises first and second look up tables for each of the color component signals.

20. Apparatus according to claim 19, wherein said control means selects one output signal from among said first and second look up tables in response to which color component signal has a minimum value.

21. A digital color iamge signal processing apparatus, comprising:
a generator for generating a plurality of color component signals, each said signal being represented by a predetermined number of bits; and
processing means for masking-processing said plurality of color component signals, including
converting means for converting each of said plurality of color component signals into a corresponding plurality of converted signals, each said converted signal being represented by a number of bits more than said predetermined number, and
summing means for summing values of said plurality of converted signals to obtain image formation color component signals.

22. A digital color image signal processing apparatus according to claim 21, wherein said generator comprises a color scanner.

23. A digital color image signal processing apparatus according to claim 21, wherein said converting means includes a plurality of look-up tables.

24. A digital color image signal processing apparatus according to claim 21, wherein said summing means outputs signals having a number of bits greater than said predetermined number.

25. A digital color image signal processing apparatus according to claim 21, wherein said plurality of color component signals includes an R signal, a B signal, and a G signal.

26. A method of processing a digital color image signal, comprising the steps of:
generating a plurality of color component signals;
converting each color component signal into a plurality of predetermined signals; and
selecting one signal from among the predetermined signals of each color component signal in which selecting conditions of said selecting step vary depending upon whether or not a signal corresponds to a minimum value among said plurality of color component signals, the selected signals being used for image formation.

27. A method according to claim 26, wherein said converting step comprsies the step of digitally processing each color component signal wherein the number of bits input to the digital processing step is smaller than the number of bits output from the digital processing step.

28. A method according ot claim 27, wherein said step of digital processing comprises the step of utilizing a memory comprising a look-up table.

29. A method of processing a digital color image signal comprising the steps of:
generating a plurality of color component signals, each said signal being represented by n-bits;
converting each of said plurality of color component signals into a corresponding plurality of converted signals, each said converted signal being represented by m-bits where m is greater than n; and
color-processing said plurality of converted signals and outputting color image formation signals.

30. A method according ot claim 29, wherein each of said color image formation signals is represented by n-bits.

31. A method according to claim 29, further comprising the step of calculating coefficients and providing said coefficients to said converting step, said converting step utilizing said coefficients to convert the color component signals into the converted signals.

32. A method according ot claim 29, wherein said plurality of color component signals includes an R signal, a B signal, and a G signal.

33. A method according to claim 32, wherein said converting step comprises the step of utilizing a first and a second look-up table for each of said R, G, and B signals.

* * * * *

UNITED STATES PATENT AND TRADEMARK OFFICE
CERTIFICATE OF CORRECTION

PATENT NO. : 5,075,767

DATED : December 24, 1991

INVENTOR(S) : Yoichi Takaragi

Page 1 of 3

It is certified that error appears in the above-identified patent and that said Letters Patent is hereby corrected as shown below:

COLUMN 1

Line 13, "exmaple" should read --example--;
Line 36, "the a main part of" should read --a main part of the--;
Line 56, "$F_R$, $R_G$, $F_B$" should read --$F_R$, $F_G$, $F_B$--; and
Line 65, "BK = K × MIN ($D_R$, $D_G$, $D_b$)" should read --BK = K × MIN ($D_R$, $D_G$, $D_B$)--.

COLUMN 2

Line 1, "frome ach" should read --from each--;
Line 10, "relation." should read --relation:--;
Line 21, "ptiner 213" should read --printer 213-- and "i" should read --is--;
Line 40, "are," should read --area,--; and
Line 57, "aspect" should read --aspect,--.

COLUMN 3

Line 13, "what" should read --that--; and
Line 55, "follows." should read --follows:--.

COLUMN 4

Line 42, "$A_{31}$, $A_{32}$, $A_{32}$" should read --$A_{31}$, $A_{32}$, $A_{33}$--;
Line 51, "$A_{13}$,-" should read --$A_{13}$- --; and
Line 56, "cyan signal" should read --cyan signal C--.

UNITED STATES PATENT AND TRADEMARK OFFICE
CERTIFICATE OF CORRECTION

PATENT NO. : 5,075,767
DATED : December 24, 1991
INVENTOR(S) : Yoichi Takaragi

It is certified that error appears in the above-identified patent and that said Letters Patent is hereby corrected as shown below:

COLUMN 5

Line 13, "follows;" should read --follows:--; and
Line 18, "(11)." should read --(11):--.

COLUMN 7

Line 5, "he" should read --the--;
Line 8, "A21×$F_R$(R)," should read --$A_{21}$×$F_R$(R),--; and
Line 23, "Step S36," should read --step S36,--.

COLUMN 8

Line 4, "ponetn" should read --ponent--;
Line 13, "By the way," should read --Incidentally,--;
Line 17, "comprie" should read --comprise--;
Line 29, "sigma lin" should read --signal in--;
Line 40, "Bk," should read --BK,--; and
Line 53, "detial" should read --detail--.

COLUMN 9

Line 4, "ot" should read --to--;
Line 13, "he" should read --the--;
Line 49, "look up" should read --look-up--;
Line 51, "whreins aid" should read --wherein said--; and
Line 53, "look up" should read --look-up--.

UNITED STATES PATENT AND TRADEMARK OFFICE
CERTIFICATE OF CORRECTION

PATENT NO. : 5,075,767

DATED : December 24, 1991

INVENTOR(S) : Yoichi Takaragi

It is certified that error appears in the above-identified patent and that said Letters Patent is hereby corrected as shown below:

COLUMN 10

```
Line 1, "claim 12" should read --claim 12,--;
Line 8, "wherien" should read --wherein--;
Line 11, "wherien" should read --wherein--;
Line 14, "claim 15" should read --claim 15,--;
Line 15, "look up" should read --look-up--;
Line 23, "and," should be deleted;
Line 39, "look up" should read --look-up--;
Line 43, "look up" should read --look-up--;
Line 45, "iamge" should read --image--; and
Line 51, "including" should read --including:--.
```

COLUMN 12

```
Line 1, "ot" should read --to--;
Line 14, "ot" should read --to--; and
Line 22, "ot" should read --to--.
```

Signed and Sealed this

Twenty-fifth Day of May, 1993

Attest:

MICHAEL K. KIRK

Attesting Officer

Acting Commissioner of Patents and Trademarks